(12) United States Patent
Lee et al.

(10) Patent No.: US 12,401,468 B2
(45) Date of Patent: Aug. 26, 2025

(54) LOGICAL CHANNEL MANAGEMENT FOR MULTIPLE eSIM PROFILES

(71) Applicant: Apple Inc., Cupertino, CA (US)

(72) Inventors: Hyewon Lee, Cupertino, CA (US); Jean-Marc Padova, San Francisco, CA (US); Li Li, Los Altos, CA (US); Xiangying Yang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 673 days.

(21) Appl. No.: 17/658,367

(22) Filed: Apr. 7, 2022

(65) Prior Publication Data

US 2022/0329372 A1    Oct. 13, 2022

Related U.S. Application Data

(60) Provisional application No. 63/174,462, filed on Apr. 13, 2021.

(51) Int. Cl.
  *H04W 72/04* (2023.01)
  *H04L 5/00* (2006.01)
  *H04W 8/18* (2009.01)
  *H04W 72/0453* (2023.01)
  *H04W 76/15* (2018.01)

(52) U.S. Cl.
  CPC .......... *H04L 5/0037* (2013.01); *H04W 8/183* (2013.01); *H04W 72/0453* (2013.01); *H04W 76/15* (2018.02)

(58) Field of Classification Search
  CPC .................................................. H04L 5/0037
  See application file for complete search history.

(56) References Cited

U.S. PATENT DOCUMENTS

| 2017/0164184 A1 | 6/2017 | Borse | |
| 2020/0137555 A1 | 4/2020 | Dos Santos et al. | |
| 2020/0288298 A1* | 9/2020 | Li | H04W 8/183 |
| 2022/0046408 A1* | 2/2022 | Kang | H04W 8/183 |

FOREIGN PATENT DOCUMENTS

| CN | 105162748 A | 12/2015 |
| CN | 107318098 A | 11/2017 |
| CN | 111480350 A | 7/2020 |

OTHER PUBLICATIONS

ETSI, Smart Cards; UICC-Terminal interface; Physical and logical characteristics (Release 15), ETSI TS 102 221 V15.5.0, release date: May 31, 2020.
Chinese Patent Application No. 202210384910.9—First Action dated Dec. 15, 2023.

* cited by examiner

*Primary Examiner* — Pamit Kaur
(74) *Attorney, Agent, or Firm* — DICKINSON WRIGHT RLLP

(57) ABSTRACT

Techniques for managing logical channel communication for multiple electronic subscriber identity module (eSIM) profiles installed on an embedded universal integrated circuit card (eUICC), including mapping of logical channel identifier values between different logical channel labeling schemes are described herein. In a first scheme, logical channels are identified using logical channel values alone. In a second scheme, logical channels are identified using a combination of eSIM port value and channel values. An interpreter in the eUICC and/or in processing circuitry external to the eUICC can map between the logical channel labeling schemes to allow internal state machines in the eUICC and/or the processing circuitry to use the first scheme for identifying logical channels.

20 Claims, 11 Drawing Sheets

320 ➤

EXEMPLARY LOGICAL CHANNEL FUNCTION ASSIGNMENT

| FUNCTION | | LOGICAL CHANNEL ASSIGNMENT | {EPORT, CHANNEL} ASSIGNMENT |
|---|---|---|---|
| ISD-R ACCESS | ISD-R | CHANNEL 2 | (EPORT 0, CHANNEL 0} |
| PROFILE A | STK (Basic Channel) | CHANNEL 0 | (EPORT 1, CHANNEL 0} |
| | USIM | CHANNEL 1 | (EPORT 1, CHANNEL 1} |
| | ISIM | CHANNEL 3 | (EPORT 1, CHANNEL 2} |
| PROFILE B | STK (Basic Channel) | CHANNEL 4 | (EPORT 2, CHANNEL 0} |
| | USIM | CHANNEL 5 | (EPORT 2, CHANNEL 1} |
| | ISIM | CHANNEL 6 | (EPORT 2, CHANNEL 2} |

LOGICAL CHANNEL MAPPING (OPTION 1)

| ESIM PORT NUMBER | ESIM PORT USAGE | LOGICAL CHANNEL NUMBER | LOGICAL CHANNEL USAGE |
|---|---|---|---|
| 0 | ISD-R ACCESS | 0 (FIXED) | ISD-R ACCESS |
| X | PROFILE A | X | BASIC CHANNEL OF PROFILE A (STK) |
| | | X1 | |
| | | X2 | |
| Y | PROFILE B | Y | BASIC CHANNEL OF PROFILE B (STK) |
| | | Y1 | |
| | | Y2 | |

*FIG. 4A*

LOGICAL CHANNEL INTERPRETER MAPPING

| ESIM PORT NUMBER | ESIM PORT USAGE | CHANNEL NUMBER (RSP COMPLIANT INTERFACE) | LOGICAL CHANNEL NUMBER (LEGACY NON-STANDARDIZED INTERFACE) | LOGICAL CHANNEL USAGE |
|---|---|---|---|---|
| 0 | ISD-R ACCESS | 0 (FIXED) | Z | ISD-R ACCESS |
| X | PROFILE A | 0 | X | BASIC CHANNEL OF PROFILE A (STK) |
|  |  | X1 | X1 |  |
|  |  | X2 | X2 |  |
| Y | PROFILE B | 0 | Y | BASIC CHANNEL OF PROFILE B (STK) |
|  |  | Y1 | Y1 |  |
|  |  | Y2 | Y2 |  |

LOGICAL CHANNEL MANAGEMENT FOR MULTIPLE eSIM PROFILES

CROSS-REFERENCE TO RELATED APPLICATIONS

The present application claims the benefit of U.S. Provisional Application No. 63/174,462, entitled "LOGICAL CHANNEL MANAGEMENT FOR MULTIPLE ENABLED eSIM PROFILES," filed Apr. 13, 2021, the content of which is incorporated herein by reference in its entirety for all purposes.

FIELD

The described embodiments set forth techniques for managing logical channel communication for multiple electronic subscriber identity module (eSIM) profiles on an embedded universal integrated circuit card (eUICC), including mapping of logical channel identifier values between different logical channel labeling schemes.

BACKGROUND

Wireless mobile network operators (MNOs) continue to upgrade wireless networks to support newer wireless communication standards, including fourth generation (4G) Long Term Evolution (LTE) and Long Term Evolution Advanced (LTE-A) technologies as well as fifth generation (5G) technologies. Wireless devices continue to evolve to incorporate newer, configurable wireless credentials, such as eSIMs that can be loaded to and subsequently activated on an eUICC of a wireless device. To support newer 5G wireless communication standards, specifications for eSIMs for 5G enabled wireless devices are being developed. With downloadable eSIMs becoming available to provide ready access to various wireless services, use of multiple eSIMs on a wireless device, including concurrent use of multiple eSIMs on an eUICC of a wireless device is proposed. Communication between the eUICC of a wireless device and a processor external to the eUICC is managed using logical channels. Different schemes are proposed for labeling multiple logical channels for communicating with multiple eSIMs installed on an eUICC of a wireless device.

SUMMARY

Representative embodiments set forth techniques for managing logical channel communication for multiple electronic subscriber identity module (eSIM) profiles on an embedded universal integrated circuit card (eUICC), including mapping of logical channel identifier values between different logical channel labeling schemes. With downloadable eSIMs becoming available to provide ready access to various wireless services, use of multiple eSIMs on a wireless device, including concurrent use of multiple eSIMs on an eUICC of a wireless device, is proposed. Communication between the eUICC of a wireless device and a processor external to the eUICC is managed using logical channels. Different schemes are proposed for labeling multiple logical channels for communicating with multiple eSIMs installed on the eUICC of a wireless device. In a first scheme, multiplexing among logical channels associated with multiple installed eSIMs uses unique logical channel values for each logical channel. In a second scheme, multiplexing among the logical channels is based on a combination of assigned eSIM port values and logical channel values. An eSIM can be assigned (or de-assigned) an eSIM port value using an application protocol data unit (APDU) command, such as a MANAGE PORT APDU command or a MANAGE UICC Logical Interface (ULI) APDU command. Multiple logical channels can be associated with the same eSIM port value for a given eSIM, with each logical channel associated with a particular eSIM port value having a distinct channel value. Identical channel values, e.g., channel "X", can be used concurrently for distinct logical channels that are associated with different installed eSIMs. In each scheme, logical channels are uniquely identifiable, and communication messages to and from an installed eSIM includes the uniquely identifiable logical channel values. With the first scheme, logical channels are identified using the logical channel value alone. With the second scheme, logical channels are identified using a combination of eSIM port value and channel values. To manage logical channel communication using either scheme, a processor of a wireless device, which implements a terminal function with logical channels internally identified by the first scheme that uses unique logical channel values only, can include an interpreter function to map between the internal unique logical channel values and external logical channel values that use the second scheme with combinations of eSIM port values and logical channel values. Alternatively and/or additionally, an eUICC that uses internal unique logical channel values can communicate with an external processor that uses the first scheme by re-using the internal unique logical channel values to identify logical channels externally for communication with the external processor. The eUICC can also communicate with an external processor that uses the second scheme to identify logical channels by including an interpreter that maps the internal logical channel values to external logical channel values that use the second scheme with combinations of eSIM port values and logical channel values to identify the logical channels externally for communication with the external processor. Logical channel mapping, implemented on the eUICC or on the external processor, can be used to communicate with multiple installed eSIMs, including eSIMs in an enabled state or in a disabled state.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

FIG. 3C illustrates an exemplary correspondence table mapping functions provided by a logical channel to different logical channel value assignments based on the schemes illustrated in FIGS. 3A and 3B, according to some embodiments.

FIGS. 4A, 4B, and 4C illustrate exemplary mappings of logical channel values between the schemes illustrated in FIGS. 3A and 3B, according to some embodiments.

FIG. 4D illustrates a table of an exemplary logical channel interpreter mapping that can be used for the schemes illustrates in FIGS. 4B and 4C, according to some embodiments.

DETAILED DESCRIPTION

Figure 1:
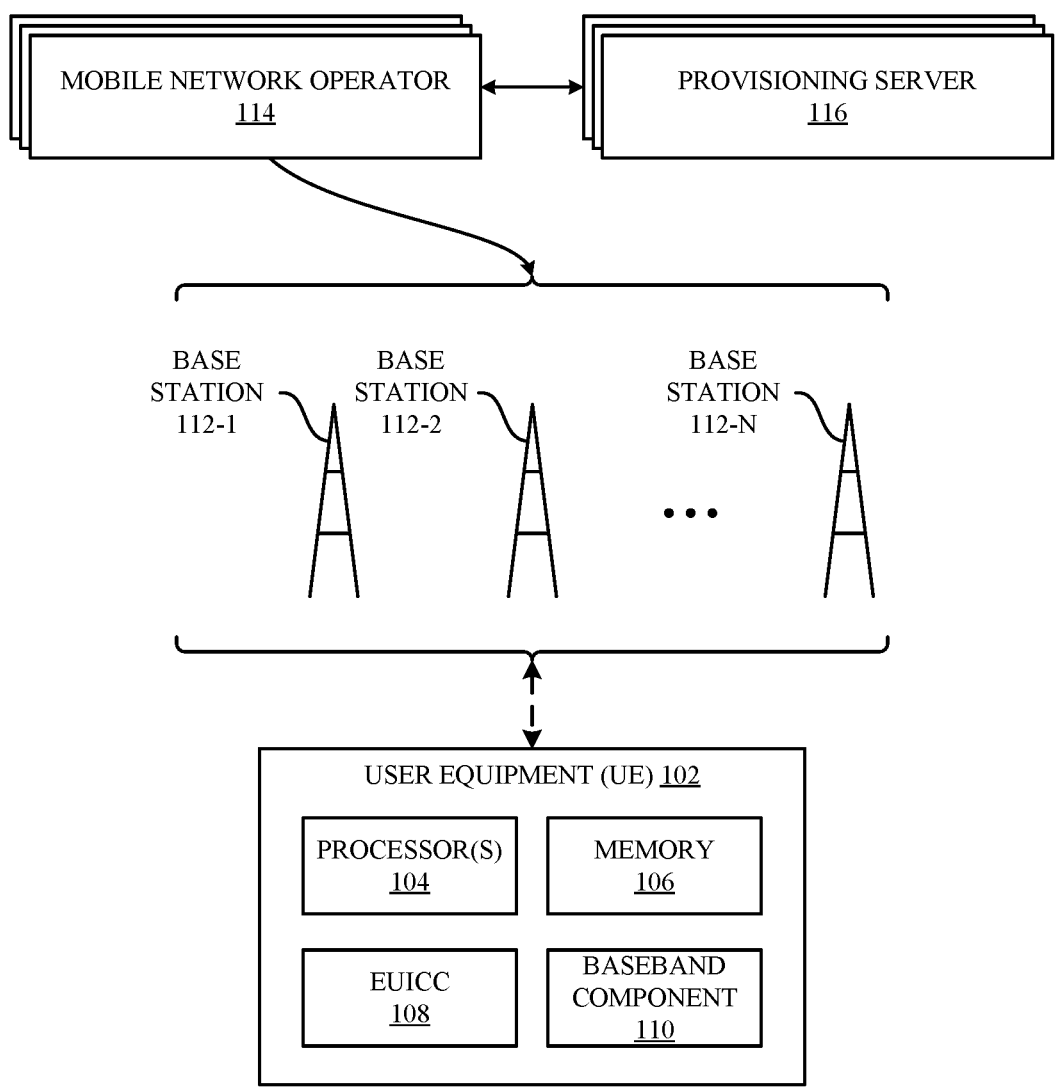
FIG. 1 illustrates a block diagram of different components of an exemplary system configured to implement the various techniques described herein, according to some embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

Representative embodiments set forth techniques for managing logical channel communication for multiple electronic subscriber identity module (eSIM) profiles installed on an embedded universal integrated circuit card (eUICC), including mapping of logical channel identifier values between different logical channel labeling schemes. With downloadable eSIMs becoming available to provide ready access to various wireless services, use of multiple eSIMs on a wireless device, including concurrent use of multiple eSIMs on an eUICC of a wireless device, is proposed. Communication between the eUICC of a wireless device and a processor external to the eUICC is managed using logical channels. Different schemes are proposed for labeling the multiple logical channels when multiple eSIMs are installed concurrently on an eUICC of a wireless device. In a first scheme, multiplexing among logical channels associated with multiple, concurrently installed eSIMs uses unique logical channel values for each logical channel. In a second scheme, multiplexing among the logical channels is based on a combination of assigned eSIM port values and logical channel values. An eSIM can be assigned (or de-assigned) an eSIM port value using an application protocol data unit (APDU) command, such as a MANAGE PORT APDU command or a MANAGE ULI APDU command. Multiple logical channels can be associated with the same eSIM port value for a given eSIM, with each logical channel associated with a particular eSIM port value having a distinct channel value. Identical channel values, e.g., channel "X", can be used concurrently for distinct logical channels that are associated with different eSIMs installed on an eUICC. In each scheme, logical channels are uniquely identifiable, and communication messages to and from an eSIM includes the uniquely identifiable logical channel values. With the first scheme, logical channels are identified using the logical channel value alone. With the second scheme, logical channels are identified using a combination of eSIM port value and logical channel value. To manage logical channel communication using either scheme, a processor of a wireless device, which implements a terminal function with logical channels internally identified by the first scheme that uses unique logical channel values only, can include an interpreter function to map between the internal unique logical channel values and external logical channel values that use the second scheme with combinations of eSIM port values and logical channel values. Alternatively and/or additionally, an eUICC that uses internal unique logical channel values can communicate with an external processor that uses the first scheme by re-using the internal unique logical channel values to identify logical channels externally for communication with the external processor. The eUICC can also communicate with an external processor that uses the second scheme to identify logical channels by including an interpreter that maps the internal logical channel values to external logical channel values that use the second scheme with combinations of eSIM port values and logical channel values to identify the logical channels externally for communication with the external processor. Logical channel mapping, implemented on the eUICC or on the external processor, can be used to communicate with multiple installed eSIMs, including eSIMs in an enabled state or in a disabled state.

These and other embodiments are discussed below with reference to FIGS. 1 through 6; however, those skilled in the art will readily appreciate that the detailed description given herein with respect to these figures is for explanatory purposes only and should not be construed as limiting.

FIG. 1 illustrates a block diagram of different components of a system 100 that is configured to implement the various techniques described herein, according to some embodiments. More specifically, FIG. 1 illustrates a high-level overview of the system 100, which, as shown, includes a user equipment (UE) 102, a group of base stations 112-1 to 112-n that are managed by different Mobile Network Operators (MNOs) 114, and a set of provisioning servers 116 that are in communication with the MNOs 114. The UE 102 can represent a mobile computing device (e.g., an iPhone® or an iPad® by Apple®), the base stations 112-1 to 112-n can represent cellular wireless network entities including evolved NodeBs (eNBs) and/or next generation NodeBs (gNBs or gNB) that are configured to communicate with the UE 102, and the MNOs 114 can represent different wireless service providers that provide specific services (e.g., voice and data) to which the UE 102 can be subscribed. The UE 102 may also be referred to as a wireless device, a mobile device, a mobile wireless device, or the like.

As shown in FIG. 1, the UE 102 can include processing circuitry, which can include one or more processors 104 and memory 106, an embedded Universal Integrated Circuit Card (eUICC) 108, and a baseband component 110. In some embodiments, the UE 102 includes one or more physical UICC cards, also referred to as Subscriber Identity Module (SIM) cards (not shown), in addition to or substituting for the eUICC. The components of the UE 102 work in conjunction to enable the UE 102 to provide useful features to a user of the UE 102, such as localized computing, location-based services, and Internet connectivity. The eUICC 108 can be configured to store multiple electronic SIMs (eSIMs) for accessing different services offered by one or more MNOs 114 through base stations 112-1 to 112-n. For example, the eUICC 108 can be configured to store and manage one or more eSIMs for one or more MNOs 114 for different subscriptions to which the UE 102 has been associated. To be able to access services provided by the MNOs, an eSIM can be provisioned to the eUICC 108. In some embodiments, the eUICC 108 obtains one or more eSIMs (or updates for one or more eSIMs) from one or more associated provisioning servers 116. It is noted that provisioning servers 116 can be maintained by a manufacturer of the UE 102, the MNOs 114, third party entities, and the like. Communication of eSIM data between a provisioning server 116 and the eUICC 108 (or between the provisioning server 116 and a processing circuitry of the UE 102 external to the eUICC 108, e.g., the processor 104) can use a secure communication channel. Multiple eSIMs can be downloaded to the eUICC 108 of the UE 102 from one or more provisioning servers 116 associated with one or more MNOs 114. The UE 102 can be configured to allow for multiple eSIMs to be enabled concurrently on the UE 102 to provide access to wireless services provided by the multiple eSIMs. Communication between the multiple eSIMs installed on the eUICC 108 and circuitry external to the eUICC 108, e.g., to a processor 104 and/or to the baseband component 110 can use one or more distinct logical channels for each installed eSIM on the eUICC 108. Communication can occur with installed eSIMs that are in an enabled state or in a disabled state.

Figure 2:
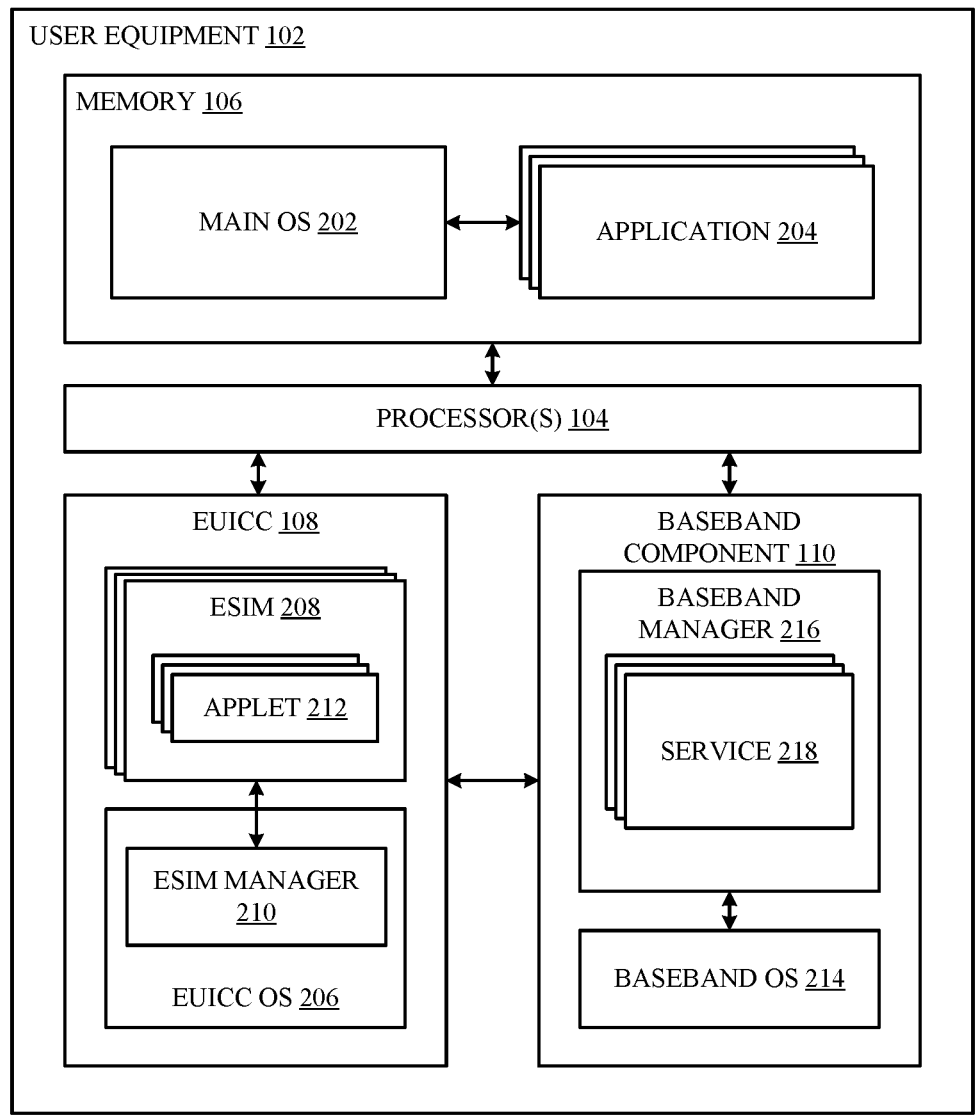
FIG. 2 illustrates a block diagram of a more detailed view of exemplary components of the system of FIG. 1, according to some embodiments.

FIG. 2 illustrates a block diagram of a more detailed view 200 of particular components of the UE 102 of FIG. 1, according to some embodiments. As shown in FIG. 2, the processor(s) 104, in conjunction with the memory 106, can implement a main operating system (OS) 202 that is configured to execute applications 204 (e.g., native OS applications and user applications). As also shown in FIG. 2, the eUICC 108 can be configured to implement an eUICC OS 206 that is configured to manage the hardware resources of the eUICC 108 (e.g., a processor and a memory embedded in the eUICC 108). The eUICC OS 206 can also be configured to manage eSIMs 208 that are stored by the eUICC 108, e.g., by installing, enabling, disabling, modifying, or otherwise performing management of the eSIMs 208 within the eUICC 108 and providing the baseband component 110 with access to the eSIMs 208 to provide access to wireless services for the UE 102. The eUICC 108 OS can include an eSIM manager 210, which can perform management functions for various eSIMs. According to the illustration shown in FIG. 2, each eSIM 208 can include a number of applets 212 that define the manner in which the eSIM 208 operates. For example, one or more of the applets 212, when implemented by the baseband component 110 and the eUICC 108, can be configured to enable the UE 102 to communicate with an MNO 114 and provide useful features (e.g., voice connections, messaging services, internet access and the like) to a user of the UE 102.

As also shown in FIG. 2, the baseband component 110 of the UE 102 can include a baseband OS 214 that is configured to manage hardware resources of the baseband component 110 (e.g., a processor, a memory, different radio components, etc.). According to some embodiments, the baseband component 110 can implement a baseband manager 216 that is configured to interface with the eUICC 108 to establish a secure channel with a provisioning server 116 and obtaining information (such as eSIM data) from the provisioning server 116 for purposes of managing eSIMs 208. The baseband manager 216 can be configured to implement services 218, which represents a collection of software modules that are instantiated by way of the various applets 212 of enabled eSIMs 208 that are included in the eUICC 108. For example, services 218 can be configured to manage different connections between the UE 102 and MNOs 114 according to the different eSIMs 208 that are enabled within the eUICC 108.

Figure 3A:
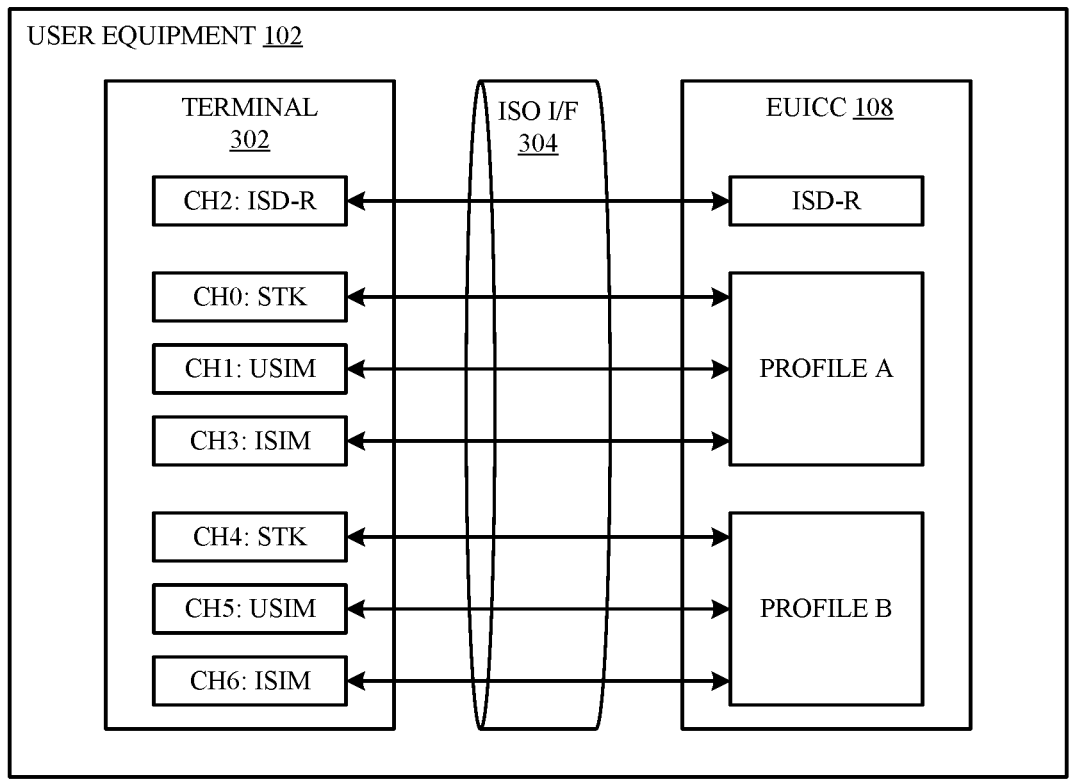
FIGS. 3A and 3B illustrate exemplary schemes for uniquely labeling logical channels for communicating through an interface between an eUICC and external processing circuitry, according to some embodiments.

FIG. 3A illustrates a block diagram 300 of a first scheme for uniquely labeling logical channels for communicating through an ISO interface 304 between an eUICC 108 and a terminal 302, which can be implemented in processing circuitry of the UE 102 external to the eUICC 108. Each internal logical channel operating within the terminal 302 is associated with a unique logical channel identifier value. A single logical channel using channel identifier value 2 (CH2) is used for communication between the terminal 302 and a root issuer security domain (ISD-R) in the eUICC 108. A set of three logical channels using channel identifier values 0, 1, and 3 (CH0, CH1, CH3) are used for communication between the terminal 302 and a first eSIM profile (Profile A). A first logical channel using channel identifier value 0 (CH0) is used for communication with the SIM application toolkit (STK) of eSIM Profile A. A second logical channel using logical channel identifier value 1 (CH1) is used for communication with a USIM application of eSIM profile A, while a third logical channel using logical channel identifier 2 (CH2) is used for communication with an ISIM application of eSIM profile A. Similarly, a second set of three logical channels using channel identifier values 4, 5, and 6 (CH4, CH5, CH6) are used for communication between the terminal 302 and the STK, a USIM application, and an ISIM application of a second eSIM profile (Profile B) on the eUICC 108. Each logical channel traversing the ISO interface 304 between the terminal 302 and the eUICC 108 is assigned a unique logical channel value. In some embodiments, a maximum number of logical channel values are allowed, e.g., a total of no more than 20 logical channels assigned concurrently. The use of the STK, the USIM application, and the ISIM application is solely provided as examples of functional elements operating with the eSIM profile that can be associated with a logical channel for communication with an external processor, e.g., terminal 302. As shown in FIG. 3A, each logical channel is assigned a uniquely identifiable logical channel identifier value. Messages communicated via the ISO interface 304 between the terminal 302 and the eUICC 108 can include the uniquely identifiable logical channel identifier values to allow the receiving entity (terminal 302 or eUICC 108) to identify an intended recipient of a message.

Figure 3B:
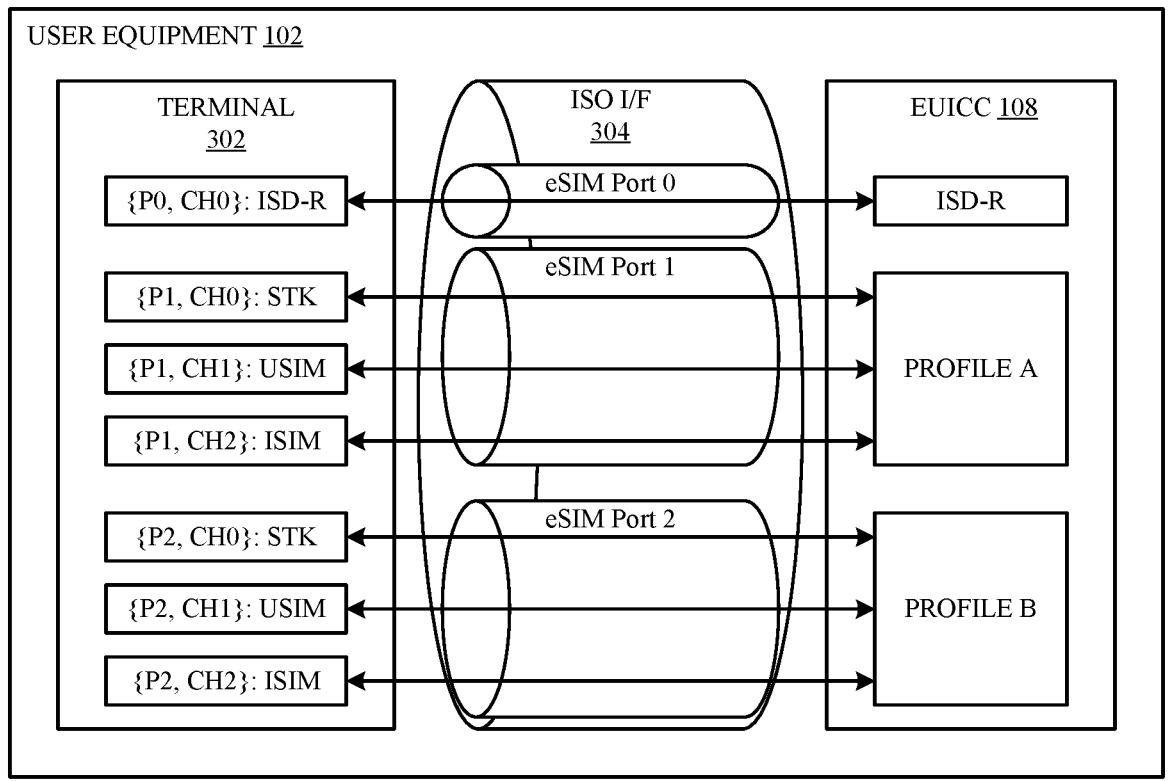

FIG. 3B illustrates a block diagram 310 of a second scheme for uniquely labeling logical channels for communicating through the ISO interface 304 between the eUICC 108 and the terminal 302 of the UE 102. In the second scheme, logical channels associated with a given eSIM profile are grouped together using an eSIM Port value. Each eSIM profile on the eUICC 108 can be assigned (or de-assigned) a unique eSIM port value using an application protocol data unit (APDU) command, such as a MANAGE PORT APDU command or a MANAGE ULI APDU command. Each distinct eSIM port can support one or more distinct logical channels up to a maximum allowable number per eSIM port. Each internal logical channel operating within the terminal 302 can be associated with a unique identifier value using a combination of an eSIM Port value and a logical channel value. A single logical channel, using the combination of eSIM Port value 0 (P0) and channel identifier value 2 (CH0), represented as the set identifier value {P0, CH0}, is used for communication between the terminal 302 and the ISD-R in the eUICC 108. A set of three logical channels using eSIM Port value 1 (P1) and channel identifier values 0, 1, and 2 (CH0, CH1, CH2) are used for communication between the terminal 302 and Profile A. A first logical channel associated with eSIM Port value 1 and channel identifier value 0 (CH0) is used for communication with the STK of eSIM Profile A. A second logical channel associated with eSIM Port value 1 and channel identifier value 1 (CH1) is used for communication with the USIM application of eSIM profile A, while a third logical channel associated eSIM Port value 1 and channel identifier 2 (CH2) is used for communication with the ISIM application of eSIM profile A. Similarly, a second set of three logical channels associated with eSIM Port value 2 and channel identifier values 0, 1, and 2 (CH0, CH1, CH2) are used for communication between the terminal 302 and the STK, the USIM application, and the ISIM application of Profile B on the eUICC 108. Each logical channel traversing the ISO interface 304 between the terminal 302 and the eUICC 108 is assigned a unique logical channel value based on a combination of the eSIM Port value and the channel value. In some embodiments, a maximum number of logical channel values are allowed, e.g., a total of no more than 20 logical channels can be assigned concurrently, for each eSIM Port value. As shown in FIG. 3B, each logical channel is assigned a uniquely identifiable logical channel identifier value represented as the set {eSIM Port value, Channel value}. Messages communicated via the ISO interface 304 between the terminal 302 and the eUICC 108 can include the uniquely identifiable logical channel identifier values, e.g., the combinations of an eSIM Port value and a Channel value, to allow the receiving entity (terminal 302 or eUICC 108) to identify an intended recipient of a message. Additionally and/or alternatively, messages communicated via the ISO interface 304 between the terminal 302 and the eUICC 108 can be preceded by one or more APDU commands, such as MANAGE PORT APDU commands or MANAGE ULI APDU commands, where the APDU commands include uniquely identifiable eSIM Port values of messages that follow the APDU commands.

FIG. 3C illustrates a correspondence table 320 that maps functions provided by a logical channel to different logical channel value assignments based on the schemes illustrated in FIGS. 3A and 3B. To access and communicate with an ISD-R on the eUICC 108, messages can include a logical channel value, e.g., Channel 2, when using logical channel values only to distinguish among multiple logical channels as in FIG. 3A, or an eSIM port value and channel value combination, e.g., {eSIM Port 0, Channel 0}, as in FIG. 3B. Multiple logical channels can be assigned to multiple installed eSIMs 208, with distinct logical channel values or eSIM port values in combination with channel values distinguishing among the logical channels for a given eSIM 208. In some embodiments, channel value 0 in combination with eSIM port value 0 is reserved for access to the ISD-R of the eUICC 108. In some embodiments, channel value 0 in combination with a non-zero eSIM port value is reserved for communication via a basic logical channel with the STK. In some embodiments, non-zero channel values in combination non-zero eSIM port values are used for communication with different eSIM applications, e.g., USIM and/or ISIM.

FIG. 4A illustrates a table 400 of a first exemplary mapping of logical channel values between the scheme of FIG. 3A and the scheme of FIG. 3B. Unlike the correspondence illustrated in FIG. 3C, in which there is no relationship between the logical channel values of the scheme of FIG. 3A and the eSIM port value and channel value combinations of FIG. 3B, in the mapping shown in table 400, the eSIM port value is re-used as the logical channel number. In this case, the eSIM port value 0 and the identical logical channel number 0 is reserved for access to the ISD-R of the eUICC 108. Further, the basic channel used for STK communication with a given eSIM profile is associated with a logical channel value equal to the assigned eSIM port value, e.g., for eSIM profile A, an eSIM port value of "X" assigned in the scheme of FIG. 3B is also used as the logical channel value for the same channel in the scheme of FIG. 3A. Additional logical channel values for the scheme of FIG. 3A are selected to be unique for communication across all eSIMs, while channel values for the scheme of FIG. 3B can re-use channel values for communication with different eSIMs. In some embodiments, a value for an eSIM port can be returned when the eSIM port is opened, e.g., in a message communicated in response to a MANAGE PORT APDU command or a MANAGE ULI APDU command. In some embodiments, an eSIM port value and/or a logical channel value of an eSIM profile can be returned when a port is opened, e.g., via a MANAGE PORT APDU command or a MANAGE ULI APDU command, or when an eSIM profile is enabled, e.g., in a message communicated in response to an Enable Profile command or a STORE DATA APDU command used to enable the eSIM profile.

Figure 4B:
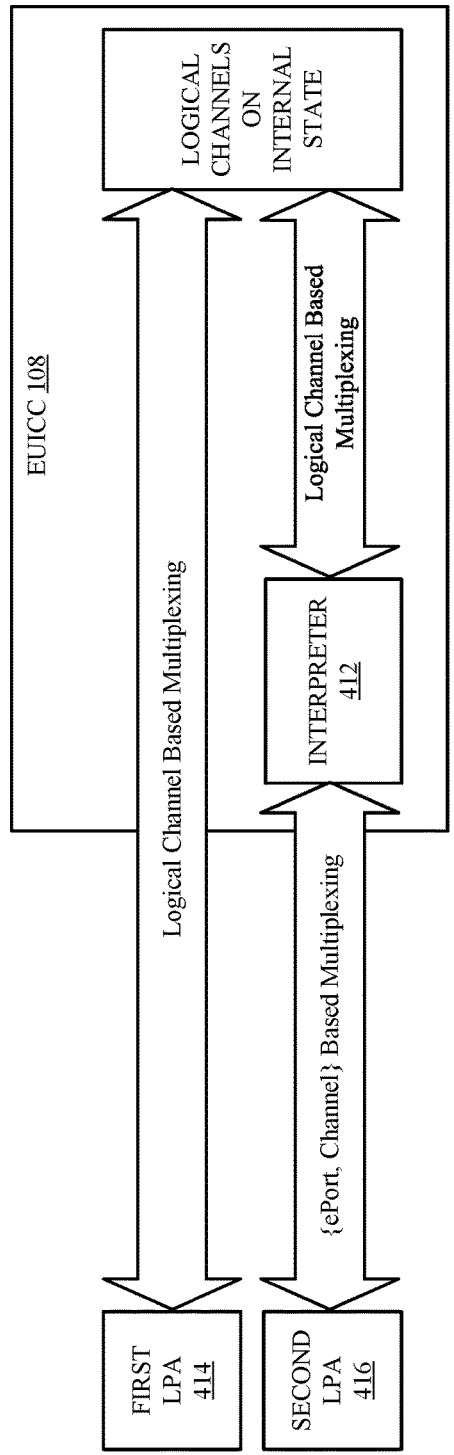

FIG. 4B illustrates a diagram 410 of another exemplary mapping of logical channel values between the logical channel value only based multiplexing scheme of FIG. 3A used by a first local profile assistant (LPA) 414 function on processing circuitry external to the eUICC 108 and the combination of eSIM port value and channel value based multiplexing scheme of FIG. 3B used by a second LPA 416 on the same (or different) processing circuitry external to the eUICC 108. In some embodiments, the first LPA 414 can be a legacy, non-standardized (e.g., proprietary) LPA. In some embodiments, the second LPA 416 can be a standardized remote SIM provisioning (RSP) LPA. An interpreter 412 function can be implemented on the eUICC 108 to allow the eUICC 108 to use logical channel values on internal states in accordance with the logical channel value only based multiplexing scheme of FIG. 3A and to map between the internal to the eUICC 108 logical channel values and the combination of eSIM port value and channel value used by the standardized scheme of FIG. 3B. When communicating via logical channels with the first LPA 414, the eUICC 108 can use logical channel values in the messages to distinguish among multiple eSIMs 208 and ISD-R access. When communicating via logical channels with the second LPA 416, the interpreter 412 of the eUICC 108 can map internal eUICC logical channel values to external {eSIM Port value, Channel value} combinations in the messages communicated via the external interface to distinguish among the multiple eSIMs 208 and ISD-R access. In some embodiments, a channel value used for the basic channel (STK function) defaults to a zero value, and the basic channel's assigned logical channel value need not be returned when opening an eSIM port for an eSIM 208. The eUICC 108 of FIG. 4B manages two distinct interfaces depending on the type of LPA with which the eUICC 108 is interworking. In some embodiments, an interface of the eUICC 108 using logical channel values can communicate with the first LPA 414, while another interface of the eUICC 108 can use the {eSIM Port value, Channel value} combinations to communicate with the second LPA 416, e.g., with an RSP-compliant LPA or with a test platform that implements an RSP LPA.

Figure 4C:
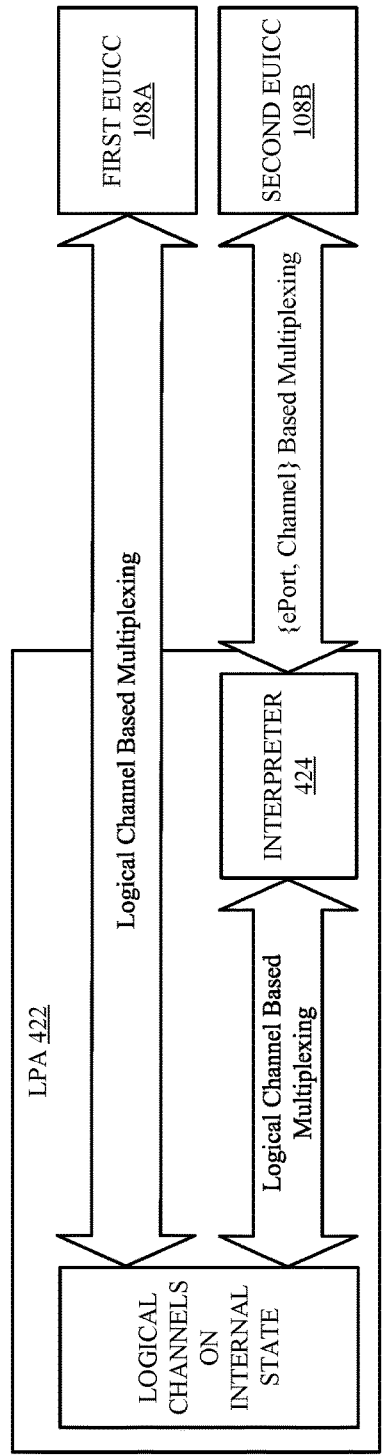

FIG. 4C illustrates a diagram 420 of a further exemplary mapping of logical channel values between the logical channel value only based multiplexing scheme of FIG. 3A used for a first interface on a first eUICC 108A and the combination of eSIM port value and channel value based multiplexing scheme of FIG. 3B used by a second interface on a second eUICC 108B. In some embodiments, the first interface of the first eUICC 108A can be a legacy, non-standardized interface, e.g., a proprietary interface, while the second interface of the second eUICC 108B can be a standardized RSP interface. In some embodiments, the first eUICC 108A can operate, at least in part, based on one or more legacy, non-standardized, e.g., proprietary, protocols, while the second eUICC 108B can operate, at least in part, based on one or more standardized RSP protocols. An interpreter 424 function can be implemented by an LPA 422 on processing circuitry external to the eUICCs 108A/108B to allow the first eUICC 108A to use logical channel values on internal states in accordance with the logical channel value only based multiplexing scheme of FIG. 3A and to allow the second eUICC 108B to use the combination of eSIM port value and channel value for logical channel assignments based on the standardized scheme of FIG. 3B. The LPA 422 includes the interpreter 424 to map between internal logical channel values used on an internal state machine of the LPA 422 and the combination of eSIM Port and channel values used for external communication with the second eUICC 108B. When communicating via logical channels with the first eUICC 108A, the LPA 422 can use logical channel values in the messages to distinguish among multiple eSIMs 208 and ISD-R access. When communicating via logical channels with the second eUICC 108B, the interpreter 424 of the LPA 422 can map internal LPA logical channel values to external {eSIM Port value, Channel value} combinations in the messages communicated via the external interface to distinguish among the multiple eSIMs 208 and ISD-R access. In some embodiments, a channel value used for the basic channel (STK function) defaults to a zero value, and the basic channel's assigned logical channel value need not be returned when opening an eSIM port for an eSIM 208. The eUICC 108 of FIG. 4B manages two distinct interfaces depending on the type of LPA with which the eUICC 108 is interworking. In some embodiments, an interface that uses logical channel values only for distinguishing among logical channels can be used to communicate with the first eUICC 108A, while another interface using the {eSIM Port value, Channel value} combinations to distinguish among different logical channels can be used to communicate with the second eUICC 108B. In some embodiments, the second eUICC 108B can be an RSP-compliant eUICC, which can be included in a test platform for testing the LPA 422.

FIG. 4D illustrates a table 430 of an exemplary logical channel interpreter mapping that can be used for the schemes illustrated in FIGS. 4B and 4C. For access to an ISD-R of an eUICC 108, an eSIM port number can be assigned a value of zero and a channel number can be fixed to use a value of zero for a logical channel associated with access to the ISD-R of the eUICC 108 via an RSP standardized interface. When accessing an ISD-R of an eUICC 108 via a legacy, logical channel number based interface, any numerical value can be assigned, e.g., a logical channel value of "Z" as shown. When communicating over a basic logical channel (STK access) of an eSIM profile, a zero-valued channel number can be used for the eSIM profile in combination with an assigned eSIM port value to identify the basic logical channel of the eSIM profile. The basic channel of each eSIM profile can use the same zero-valued channel number. A logical channel number used for a legacy, logical channel value only based interface, however, can be different for each eSIM profile. Logical channel values for the legacy interface must be distinct for each logical channel opened on the legacy interface. The logical channel values can be the same as the channel number values in some cases, e.g., when the channel number values are distinct as shown in FIG. 4D for the non-basic logical channels, or can differ from the channel number values, such as when channel number values are re-used across different eSIM profiles as shown in FIG. 3C.

Figure 5:
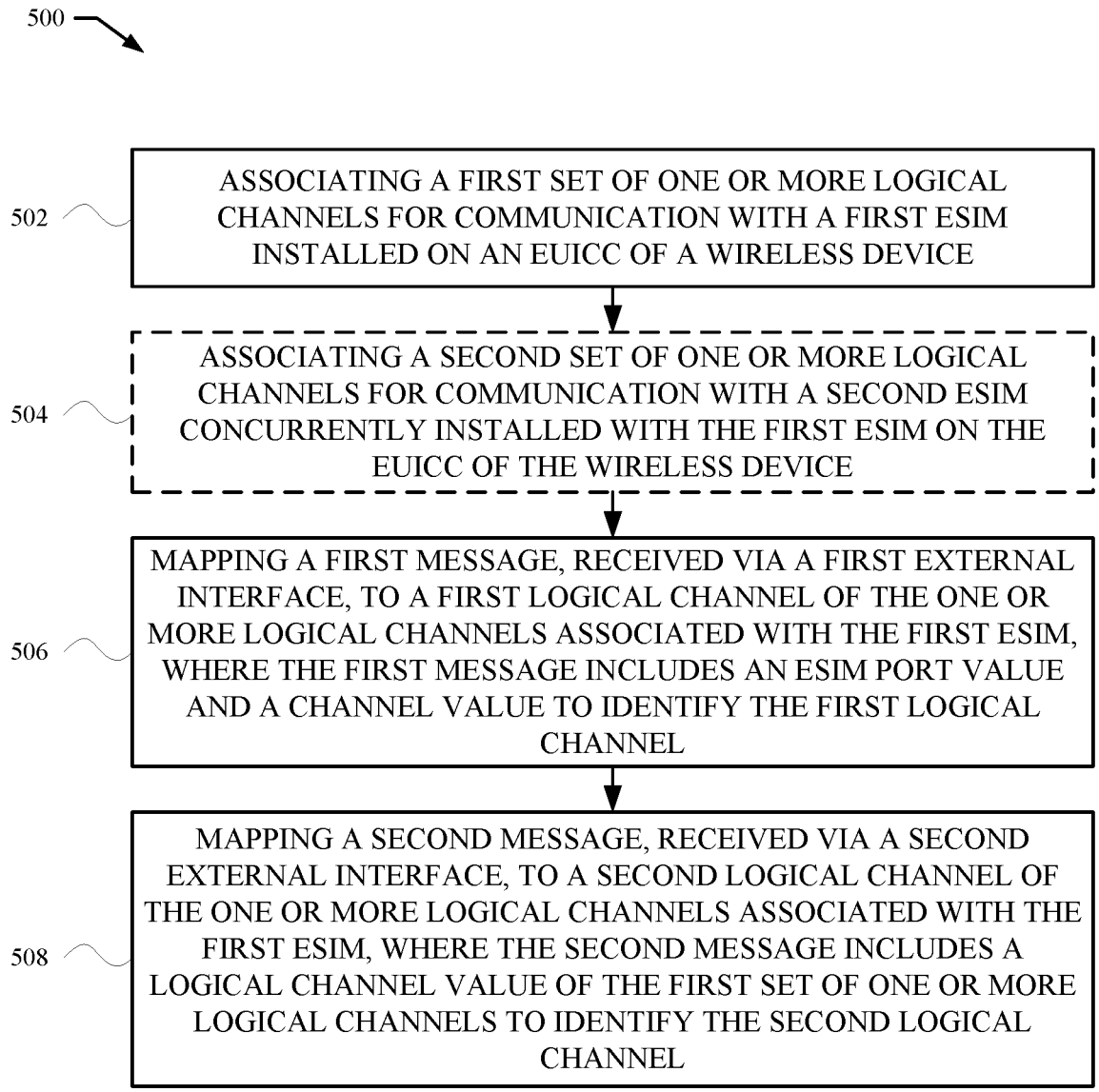
FIG. 5 illustrates a flow diagram of an exemplary sequence of actions by an apparatus of a wireless device for managing logical channel values with multiple installed eSIMs, according to some embodiments.

FIG. 5 illustrates a flowchart 500 of an exemplary method for managing logical channel values with multiple eSIMs, the method performed by an apparatus of a wireless device 102. At 502, the apparatus associates a first set of one or more logical channels for communication with a first eSIM 208 installed on an eUICC 108 of the wireless device 102. At 504, in some embodiments, the apparatus associates a second set of one or more logical channels for communication with a second eSIM 208 concurrently installed with the first eSIM 208 on the eUICC 108 of the wireless device 102. At 506, the apparatus maps a first message, received via a first external interface, to a first logical channel of the one or more logical channels associated with the first eSIM 208, where the first message includes an eSIM port value and a channel value to identify the first logical channel. At 508, the apparatus maps a second message, received via a second external interface, to a second logical channel of the one or more logical channels associated with the first eSIM 208, where the second message includes a logical channel value of the first set of one or more logical channels to identify the second logical channel.

In some embodiments, the first and second external interfaces use a common physical interface; the physical interface is configured as the first external interface to use combinations of eSIM port values and channel values to identify distinct logical channels; and the physical interface is configured as the second external interface to use logical channel values only to identify distinct logical channels. In some embodiments, the apparatus includes an interpreter 412 functional block operating on the eUICC 108 of the wireless device 102. In some embodiments, the apparatus includes an interpreter 424 functional block operating on an LPA 422 of the wireless device 102. In some embodiments, the apparatus associates a second set of one or more logical channel values with one or more logical channels for communication with a second eSIM 208 concurrently installed with the first eSIM 208 on the eUICC 108 of the wireless device 102, where each logical channel value in the first and second sets of one or more logical channel values are distinct. In some embodiments, the apparatus maps a second message, received via the first external interface, to a second logical channel of the one or more logical channels associated with the first eSIM 208, where the second message includes the eSIM port value (as in the first message and associated with the first eSIM 208) and a second channel value to identify the second logical channel. In some embodiments, the apparatus associates a non-zero logical channel value with a second logical channel for communication with a root issuer security domain (ISD-R) of the eUICC 108.

Figure 6:
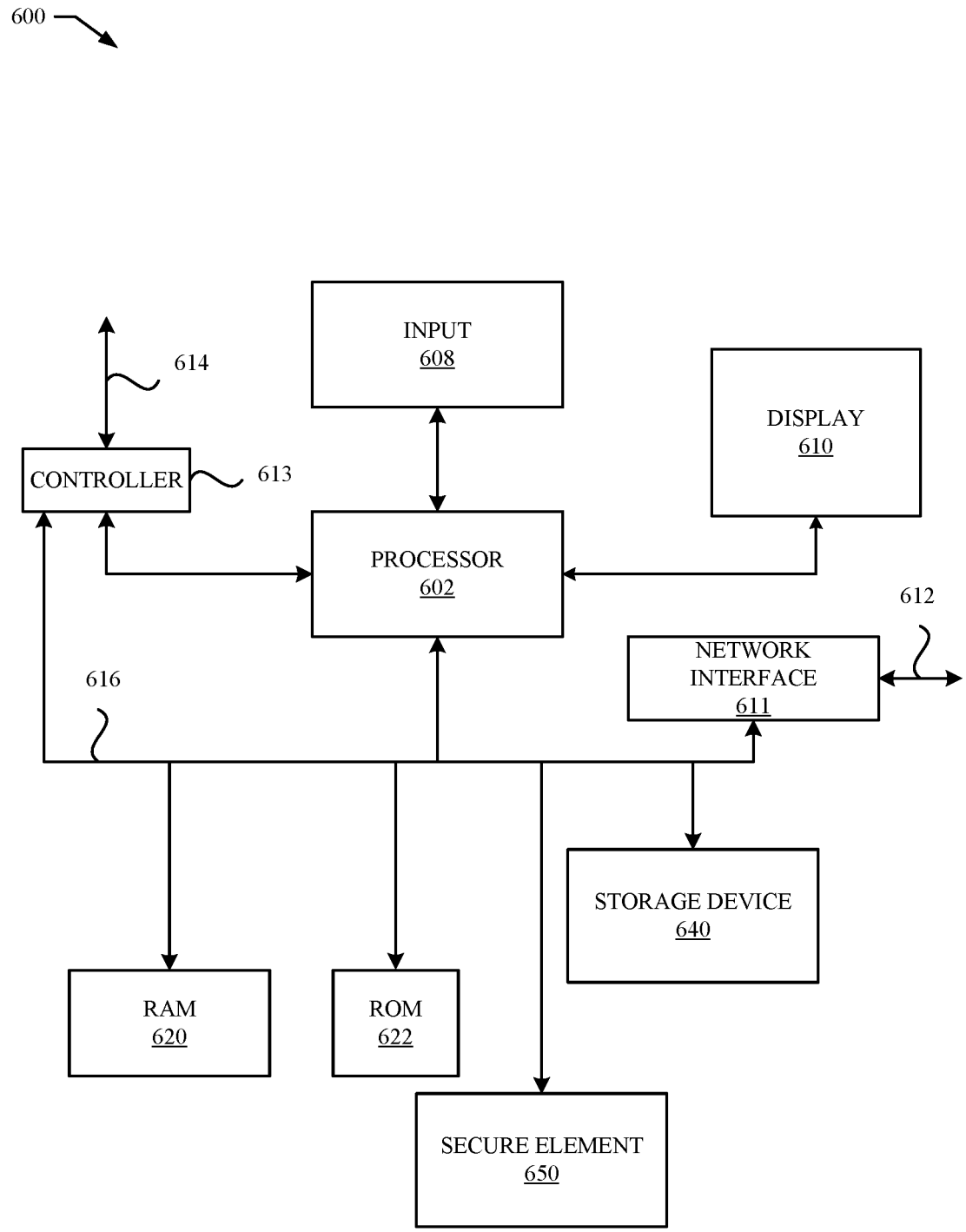
FIG. 6 illustrates a detailed view of a representative computing device that can be used to implement various methods described herein, according to some embodiments.

FIG. 6 illustrates a detailed view of a representative computing device 600 that can be used to implement various methods described herein, according to some embodiments. In particular, the detailed view illustrates various components that can be included in the UE 102 illustrated in FIG. 1. As shown in FIG. 6, the computing device 600 can include a processor 602 that represents a microprocessor or controller for controlling the overall operation of computing device 600. The computing device 600 can also include a user input device 608 that allows a user of the computing device 600 to interact with the computing device 600. For example, the user input device 608 can take a variety of forms, such as a button, keypad, dial, touch screen, audio input interface, visual/image capture input interface, input in the form of sensor data, etc. Still further, the computing device 600 can include a display 610 that can be controlled by the processor 602 to display information to the user. A data bus 616 can facilitate data transfer between at least a storage device 640, the processor 602, and a controller 613. The controller 613 can be used to interface with and control different equipment through and equipment control bus 614. The computing device 600 can also include a network/bus interface 611 that couples to a data link 612. In the case of a wireless connection, the network/bus interface 611 can include a wireless transceiver.

The computing device 600 also includes a storage device 640, which can comprise a single disk or a plurality of disks (e.g., hard drives), and includes a storage management module that manages one or more partitions within the storage device 640. In some embodiments, storage device 640 can include flash memory, semiconductor (solid state) memory or the like. The computing device 600 can also include a Random Access Memory (RAM) 620 and a Read-Only Memory (ROM) 622. The ROM 622 can store programs, utilities or processes to be executed in a non-volatile manner. The RAM 620 can provide volatile data storage, and stores instructions related to the operation of the computing device 600. The computing device 600 can further include a secure element (SE) 650, which can represent the eUICC 108 of the UE 102.

Wireless Technology

In accordance with various embodiments described herein, the terms "wireless communication device," "wireless device," "mobile device," "mobile station," and "user equipment" (UE) may be used interchangeably herein to describe one, or any number of, common consumer electronic device(s) that may be capable of performing procedures associated various embodiments the disclosure. In accordance with various implementations, any one of these consumer electronic devices may relate to: a cellular phone or a smart phone, a tablet computer, a laptop computer or a netbook computer, a media player device, an electronic book device, a MiFi® device, a wearable computing device, as well as any other type of electronic computing device having fourth generation (4G) Long Term Evolution (LTE) and LTE Advanced (LTE-A), fifth generation (5G) new radio (NR), or similar "later generation" cellular wireless access communication capabilities.

Additionally, it should be understood that the UEs described herein may be configured as multi-mode wireless devices that are also capable of communicating via legacy third generation (3G) and/or second generation (2G) RATs in addition to communicating with 4G wireless networks, as well as communicating using one or more different wireless local area networks. Multi-mode UEs can include support for communication in accordance with one or more different wireless communication protocols developed by standards bodies, e.g., 3GPP's Global System for Mobile Communications (GSM), Universal Mobile Telecommunications System (UMTS), LTE, LTE-A, and 5G NR standards or 3GPP2's CDMA2000 (1×RTT, 2×EV-DO, HRPD, eHRPD) standards. Multi-mode UEs can also support communication using wireless local area networking protocols, e.g., the Institute of Electrical and Electronics Engineers (IEEE) 802.11 (Wi-Fi), IEEE 802.16 (WiMAX), and wireless personal area networking protocols, e.g., Bluetooth®. Multiple wireless communication protocols can provide complementary functions and/or different services for a multi-mode UE.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The various aspects, embodiments, implementations or features of the described embodiments can be used separately or in any combination. Further, some aspects of the described embodiments may be implemented by software, hardware, or by a combination of hardware and software. The described embodiments can also be embodied as computer program code stored on a non-transitory computer-readable medium. The computer readable-medium may be associated with any data storage device that can store data, which can thereafter be read by a computer or a computer system. Examples of the computer-readable medium include read-only memory, random-access memory, CD-ROMs, Solid-State Disks (SSD or Flash), HDDs, DVDs, magnetic tape, and optical data storage devices. The computer-readable medium can also be distributed over network-coupled computer systems so that the computer program code may be executed in a distributed fashion.

The foregoing description, for purposes of explanation, used specific nomenclature to provide a thorough understanding of the described embodiments. However, it will be apparent to one skilled in the art that some of the specific details are not required in order to practice the described embodiments. Thus, the foregoing descriptions of specific embodiments are presented herein for purposes of illustration and description. These descriptions are not intended to be exhaustive, all-inclusive, or to limit the described embodiments to the precise forms or details disclosed. It will be apparent to one of ordinary skill in the art that many modifications and variations are possible in view of the above teachings, without departing from the spirit and the scope of the disclosure.

What is claimed is:

1. An apparatus configured for operation in a wireless device, the apparatus comprising:
   at least one processor communicatively coupled to a memory storing instructions that, when executed by the at least one processor, configure the apparatus to:
   associate a first set of one or more logical channel values with one or more logical channels for communication with a first electronic subscriber identity module (eSIM) installed on an embedded universal integrated circuit card (eUICC) of the wireless device; and map a first message, received via a first external interface, to a first logical channel of the one or more logical channels associated with the first eSIM, wherein the first message includes an eSIM port value and a channel value to identify the first logical channel, wherein:
the first external interface is configured to use combinations of eSIM port values and channel values to identify distinct logical channels;
a second external interface is configured to use logical channel values only to identify distinct logical channels; and
the first and second external interfaces comprise a common physical interface.

2. The apparatus of claim 1, wherein the apparatus is further configured to:
map a second message, received via the second external interface, to a second logical channel of the one or more logical channels associated with the first eSIM, wherein the second message includes a logical channel value of the first set of one or more logical channel values to identify the second logical channel.

3. The apparatus of claim 1, wherein:
the first external interface connects the eUICC of the wireless device to a first local profile assistant (LPA) operating on a processor of the wireless device external to the eUICC of the wireless device; and
the second external interface connects the eUICC of the wireless device to a second local LPA operating on the processor of the wireless device external to the eUICC of the wireless device.

4. The apparatus of claim 1, wherein:
the first external interface connects a local profile assistant (LPA) operating on a processor of the wireless device external to the eUICC of the wireless device to the eUICC of the wireless device; and
the second external interface connects the LPA of the wireless device to a second eUICC of the wireless device.

5. The apparatus of claim 1, wherein the apparatus comprises an interpreter functional block operating on the eUICC of the wireless device.

6. The apparatus of claim 1, wherein the apparatus comprises an interpreter functional block of a local profile assistant (LPA) operating on a processor of the wireless device external to the eUICC of the wireless device.

7. The apparatus of claim 1, wherein the apparatus is further configured to:
associate a second set of one or more logical channel values with one or more logical channels for communication with a second eSIM concurrently installed with the first eSIM on the eUICC of the wireless device,
wherein each logical channel value in the first and second sets of one or more logical channel values are distinct.

8. The apparatus of claim 7, wherein the apparatus is further configured to:
map a second message, received via the first external interface, to a second logical channel of the one or more logical channels associated with the first eSIM, wherein the second message includes the eSIM port value and a second channel value to identify the second logical channel.

9. The apparatus of claim 1, wherein the apparatus is further configured to:
associate a non-zero logical channel value with a second logical channel for communication with a root issuer security domain (ISD-R) of the eUICC.

10. A method of wireless communication comprising:
associating a first set of one or more logical channel values with one or more logical channels for communication with a first electronic subscriber identity module (eSIM) installed on an embedded universal integrated circuit card (eUICC) of a wireless device; and
mapping a first message to a first logical channel of the one or more logical channels associated with the first eSIM, wherein the first message includes an eSIM port value and a channel value to identify the first logical channel, wherein:
combinations of eSIM port values and channel values identify distinct logical channels when communicated via a first interface between a processor of the wireless device external to the eUICC and the eUICC;
only logical channel values identify distinct logical channels when communicated via a second interface between the processor of the wireless device external to the eUICC and the eUICC; and
in a first configuration, the first and second interfaces comprise a common physical interface, or in a second configuration, the first and second interfaces each comprise distinct physical interfaces.

11. The method of claim 10, further comprising:
mapping a second message to a second logical channel of the one or more logical channels associated with the first eSIM, wherein the second message includes a logical channel value of the first set of one or more logical channel values to identify the second logical channel.

12. The method of claim 11, wherein:
the first interface connects the eUICC to a first local profile assistant (LPA) operating on the processor of the wireless device external to the eUICC of the wireless device; and
the second interface connects the eUICC of the wireless device to a second local LPA operating on the processor of the wireless device external to the eUICC of the wireless device.

13. The method of claim 10, wherein:
the first interface connects a local profile assistant (LPA) operating on the processor of the wireless device external to the eUICC to the eUICC of the wireless device; and
the second interface connects the LPA of the wireless device to a second eUICC of the wireless device.

14. The method of claim 10, wherein an interpreter functional block operates on the eUICC of the wireless device.

15. The method of claim 10, wherein an interpreter functional block of a local profile assistant (LPA) operates on a processor of the wireless device external to the eUICC of the wireless device.

16. The method of claim 10, further comprising:
associating a second set of one or more logical channel values with one or more logical channels for communication with a second eSIM concurrently installed with the first eSIM on the eUICC of the wireless device; and
mapping a second message to a second logical channel of the one or more logical channels associated with the first eSIM, wherein the second message includes the eSIM port value and a second channel value to identify the second logical channel,
wherein each logical channel value in the first and second sets of one or more logical channel values are distinct.

17. The method of claim 10, further comprising:
associating a non-zero logical channel value with a second logical channel for communication with a root issuer security domain (ISD-R) of the eUICC.

18. A non-transitory computer-readable medium storing instructions that, when executed by one or more processors of a wireless device, cause the wireless device to:
associate a first set of one or more logical channel values with one or more logical channels for communication with a first electronic subscriber identity module (eSIM) installed on an embedded universal integrated circuit card (eUICC) of the wireless device; and
map a first message to a first logical channel of the one or more logical channels associated with the first eSIM, wherein the first message includes an eSIM port value and a channel value to identify the first logical channel,
wherein:
combinations of eSIM port values and channel values identify distinct logical channels when communicated via a first interface between a processor of the wireless device external to the eUICC and the eUICC;
only logical channel values identify distinct logical channels when communicated via a second interface between the processor of the wireless device external to the eUICC and the eUICC; and
in a first configuration, the first and second interfaces comprise a common physical interface, or in a second configuration, the first and second interfaces each comprise distinct physical interfaces.

19. The non-transitory computer-readable medium of claim 18, wherein:
the first interface connects the eUICC to a first local profile assistant (LPA) operating on the processor of the wireless device external to the eUICC of the wireless device; and
the second interface connects the eUICC of the wireless device to a second local LPA operating on the processor of the wireless device external to the eUICC of the wireless device.

20. The non-transitory computer-readable medium of claim 18, wherein:
the first interface connects a local profile assistant (LPA) operating on the processor of the wireless device external to the eUICC to the eUICC of the wireless device; and
the second interface connects the LPA of the wireless device to a second eUICC of the wireless device.

* * * * *